United States Patent
Zhao et al.

(10) Patent No.: US 12,520,280 B2
(45) Date of Patent: Jan. 6, 2026

(54) METHOD AND DEVICE FOR SELECTING RESOURCE, AND STORAGE MEDIUM

(71) Applicant: Beijing Xiaomi Mobile Software Co., Ltd., Beijing (CN)

(72) Inventors: Wensu Zhao, Beijing (CN); Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 352 days.

(21) Appl. No.: 18/044,720

(22) PCT Filed: Sep. 25, 2020

(86) PCT No.: PCT/CN2020/117815
§ 371 (c)(1),
(2) Date: Mar. 9, 2023

(87) PCT Pub. No.: WO2022/061734
PCT Pub. Date: Mar. 31, 2022

(65) Prior Publication Data
US 2023/0379887 A1    Nov. 23, 2023

(51) Int. Cl.
*H04W 72/40* (2023.01)
*H04W 72/02* (2009.01)
*H04W 72/25* (2023.01)

(52) U.S. Cl.
CPC ........... *H04W 72/02* (2013.01); *H04W 72/25* (2023.01)

(58) Field of Classification Search
CPC ......... H04W 4/40; H04W 4/70; H04W 72/02; H04W 72/0446; H04W 72/25; H04W 72/40; H04W 92/18
See application file for complete search history.

(56) References Cited

U.S. PATENT DOCUMENTS

| 2020/0037343 | A1* | 1/2020 | He ........................ H04W 72/20 |
| 2021/0227621 | A1* | 7/2021 | Pan .................... H04W 72/0446 |
| 2022/0030575 | A1* | 1/2022 | Farag .................... H04L 5/0053 |
| 2022/0086803 | A1* | 3/2022 | Li ..................... H04W 72/0446 |
| 2023/0118247 | A1* | 4/2023 | Lin ..................... H04W 72/044 370/329 |
| 2023/0171738 | A1* | 6/2023 | Di Girolamo ........ H04W 72/02 370/329 |
| 2023/0276474 | A1* | 8/2023 | Mohammad .......... H04W 72/04 370/329 |
| 2023/0362934 | A1* | 11/2023 | Grieco .................. H04W 76/11 |

OTHER PUBLICATIONS

Extended European Search Report issued in Application No. 20954586.2 dated Apr. 4, 2024, 11 pages.
(Continued)

*Primary Examiner* — Frank Duong
(74) *Attorney, Agent, or Firm* — Finnegan, Henderson, Farabow, Garrett & Dunner, L.L.P.

(57) ABSTRACT

A method for selecting a resource is performed by a first device, and includes: sending an assistance request for requesting a second device to provide an assistance resource set; and receiving an assistance resource report from the second device, wherein the assistance resource report indicates the assistance resource set provided by the second device.

14 Claims, 8 Drawing Sheets

(56) References Cited

OTHER PUBLICATIONS

Fraunhofer HHI, Fraunhofer IIS, "Resource Allocation for Mode 2 NR V2X", 3GPP TSG RAN WG1 #99, R1-1912289, Reno, USA, Nov. 18-22, 2019, 9 pages.
International Search Report and Written Opinion of International Application No. PCT/CN2020/117815, dated Jul. 1, 2021, 15 pages.
Moderator (LG Electronics), Summary for AI 8.11.2.2 Feasibility and benefits for mode 2 enhancements, #3GPP TSG RAN WG1 #102-e, R1-2007412, e-Meeting, Aug. 17-28, 2020, 33 pages.
Fraunhofer HHI, Fraunhofer IIS, Resource Allocation Enhancements for Mode 2, 3GPP TSG RAN WG1 Meeting #102-e, R1-2005537, e-Meeting, Aug. 17-28, 2020, 9 pages.
Fujitsu, Considerations on inter-UE coordination for mode 2 enhancements, 3GPP TSG RAN WG1 #102-e, R1-2005546, e-Meeting, Aug. 17-28, 2020, 11 pages.
Spreadtrum Communications, Discussion on feasibility and benefit of mode 2 enhancements, 3GPP TSG RAN WG1 #102-e, R1-2006268, e-Meeting, Aug. 17-28, 2020, 5 pages.
Qualcomm Incorporated, Reliability and Latency Enhancements for Mode 2, 3GPP TSG RAN WG1 #102-e, R1-2006829, Aug. 17-28, 2020, 10 pages.

\* cited by examiner

METHOD AND DEVICE FOR SELECTING RESOURCE, AND STORAGE MEDIUM

CROSS-REFERENCE TO RELATED APPLICATION

This application is a national phase of International Application No. PCT/CN2020/117815, filed on Sep. 25, 2020, the entire content of which is incorporated herein by reference.

TECHNICAL FIELD

The disclosure relates to the field of communication technologies, and particularly to, a method and a device for selecting a resource, and a storage medium.

BACKGROUND

Since the long term evolution (LTE), the third generation partnership (3GPP) is always formulating a sidelink standard as a direct communication standard from a terminal to another terminal. A first standard of a new radio (NR) sidelink has been completed in release 16 since July 2020. A solution of the NR sidelink is mainly applied to vehicle to everything (V2X) and public security. For the V2X and public security, release 16 does not fully support service requirements and operating schemes due to time constraints, but service and system aspects (SA) are enhanced in release 17 NR Sidelink, for example, architecture enhancement and system enhancement for supporting advanced V2X services for the 3GPP. In addition, other business cases related to the NR sidelink are being studied in an SA workgroup, such as a network-controlled interaction service, an enhanced energy efficiency relay, a wide coverage, and an audio-visual service production. Therefore, at the 86th session of 3GPP, in a release 17 program, enhancement of the NR sidelink is taken as a work program, to enhance the reliability of sidelink transmission and reduce the delay.

SUMMARY

According to a first aspect of the present disclosure, a method for selecting a resource is provided and applicable to a first device. The method for selecting the resource includes: sending an assistance request for requesting a second device to provide an assistance resource set; and receiving an assistance resource report from the second device, in which, the assistance resource report indicates the assistance resource set provided by the second device.

According to a second aspect of the present disclosure, a method for selecting a resource is provided and applicable to a second device. The method for selecting the resource includes: receiving an assistance request for requesting the second device to provide an assistance resource set; and sending an assistance resource report, in which, the assistance resource report indicates the assistance resource set provided by the second device.

According to a third aspect of the present disclosure, a device for selecting a resource is provided and includes: a processor; and a memory configured to store instructions executable by the processor; in which, the processor is configured to perform the method for selecting the resource in the first aspect.

According to a fourth aspect of the present disclosure, a device for selecting a resource is provided, and includes: a processor; and a memory configured to store instructions executable by the processor; in which, the processor is configured to perform the method for selecting the resource in the second aspect.

According to a fifth aspect of the present disclosure, a non-transitory computer-readable storage medium is provided. When instructions in the storage medium are executed by a processor of a first device, the first vehicle is caused to perform the method for selecting the resource in the first aspect.

According to a sixth aspect of the present disclosure, a non-transitory computer-readable storage medium is provided. When instructions in the storage medium are executed by a processor of a second device, the second vehicle is caused to perform the method for selecting the resource in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
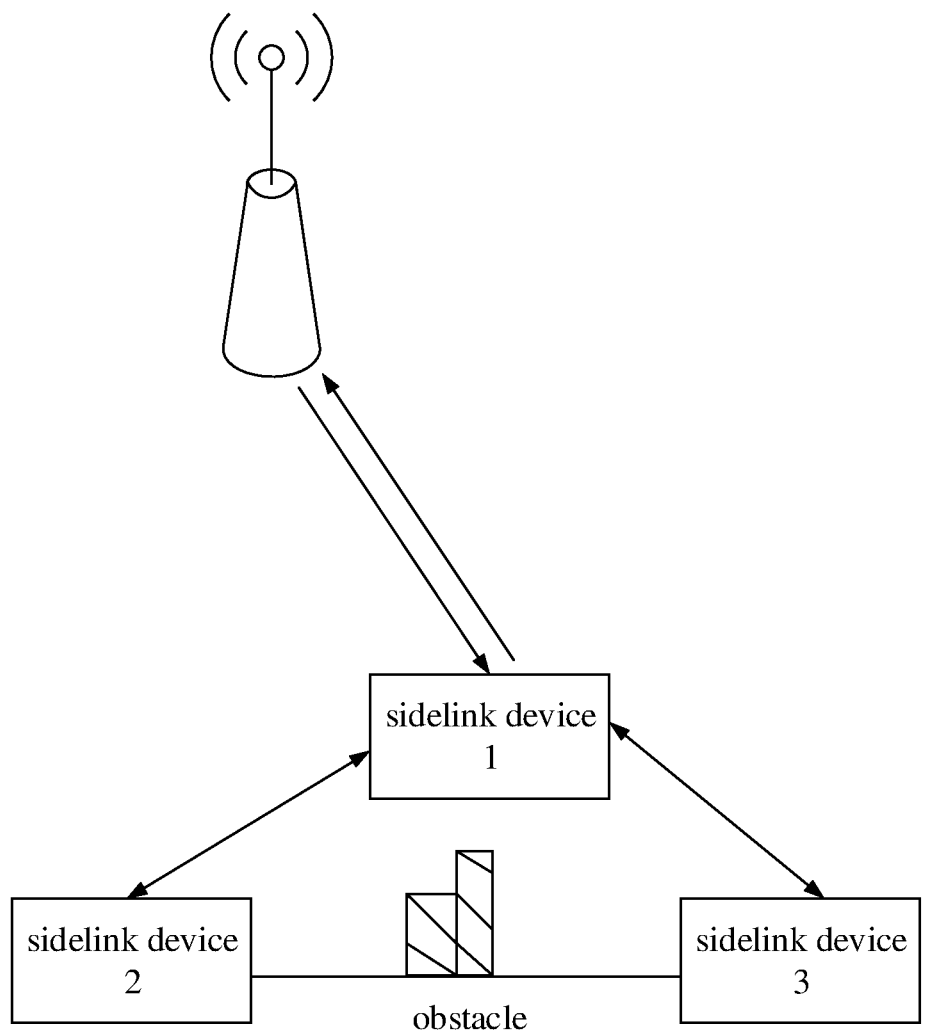
FIG. 1 is a diagram illustrating an architecture of a sidelink according to some embodiments.

A method for selecting a resource, provided in embodiments of the disclosure, is applicable to a sidelink system as illustrated in FIG. 1. As illustrated in FIG. 1, in a sidelink scenario among sidelink devices, a network device configures transmission parameters for data transmission for a sidelink device 1. Sidelink is performed on a sidelink device 1, a sidelink device 2, and a sidelink device 3. There may be an obstacle between the sidelink device 2 and the sidelink device 3. Communication links between the network device and the sidelink device are an uplink and a downlink. A link between the sidelink device and the sidelink device is a sidelink.

In the disclosure, a scenario of sidelink communication among sidelink devices may be a vehicle to everything (V2X) service scenario. V represents a vehicle-mounted device and X represents any object that interacts with the vehicle-mounted device. X mainly includes a vehicle-mounted device, a handheld device, a traffic side infrastructure, and a network. Information patterns of V2X interaction include vehicle to vehicle (V2V) interaction, vehicle to infrastructure (V2I) interaction, vehicle to pedestrian (V2P) interaction, and vehicle to network (V2N) interaction.

With the development of the new fifth generation (5G) mobile communication technology, a 5G NR technology is applied in a 3GPP release 16 to support new V2X communication services and scenarios, such as vehicles platooning, extended sensors, advanced driving, remote driving, and the like. In general, a 5G V2X sidelink may provide a higher communication rate, a shorter communication delay, and a more reliable communication quality.

A scenario of sidelink communication among sidelink devices also may be a device to device (D2D) communication scenario. In embodiments of the disclosure, the sidelink device for the sidelink communication may include various handheld devices, vehicle-mounted devices, wearable devices, and computing devices, which are with wireless communication functions, or other processing devices connected to wireless modems, as well as various forms of user equipments (UEs), mobile stations (MSs), terminals, terminal equipments, etc. For ease of description, in embodiments of the disclosure, it is illustrated by taking a sidelink device being a user equipment for an example.

The enhancement of the NR sidelink may improve a transmission reliability and reduce a delay. In the enhancement of the NR sidelink, a 3GPP work group has concluded that a method for assisting in selecting a resource between user equipments is required in enhancing a mode 2 resource allocation. Two user equipments are specified in the method. For example, a user equipment A is an assistance user equipment of a user equipment B, and the user equipment B refers to a user equipment that needs to select a resource for data that to be sent by the user equipment B itself. The user equipment A may determine a resource set and sends the resource set to the user equipment B by means of a mode 2, and the user equipment B may consider the resource set sent by the user equipment A when selecting the resource.

In the related art, the user equipment B generally determines a candidate resource set based on its own resource perception result and sends data by using the determined candidate resource set. However, when the user equipment B determines the candidate resource set for data transmission by means of resource perception, due to presence of hidden nodes, the user equipment B is unable to receive sidelink control information (SCI) of a hidden node user equipment and measure a reference signal receiving power (RSRP). Therefore, when the candidate resource set is determined, if the user equipment B takes resources reserved by the hidden node user equipment as a part of candidate resources, and when the user equipment B sends data by using the resources reserved by the hidden node, a conflict may occur. Further, due to presence of exposed nodes, the user equipment B excludes resources that may be taken as the candidate resource set, and the resources excluded by the user equipment B are not used by the user equipment B for data transmission, which results in a low resource utilization rate.

Therefore, a method for selecting a resource is provided in embodiments of the disclosure. In the method for selecting the resource, a method for assisting in selecting a resource is adopted between sidelink user equipments, so that when the user equipment B selects the resource, a resource for sending data may be selected based on a candidate resource set perceived by the user equipment B itself and an assistance resource set sent by the user equipment A, which improves the reliability of data transmission of the user equipment B and reduces the probability of conflicts.

In the related art, when the user equipment A assists the user equipment B in selecting the resource, the following problems have not been solved:

(1) conditions when the user equipment A is triggered to assist the user equipment B in selecting the resource, that is, how to trigger the user equipment A to assist the user equipment B in selecting the resource.

(2) specific steps and timing sequences that the user equipment A assists the user equipment B.

In view of this, in the method for selecting the resource provided in embodiments of the disclosure, conditions, steps, and/or timing sequences of implementation of assisting in selecting the resource for the sidelink device are optimized. For example, in embodiments of the disclosure, the mode 2 resource allocation is enhanced by determining conditions, steps, and/or timing sequences that the user equipment A assists the user equipment B in selecting the resource, which reduces the probability of conflicts and effectively improves the reliability of data transmission.

In an implementation, in embodiments of the disclosure, the device (the user equipment B) for selecting the resource is referred to as a first device, and the device (the user equipment A) that assists the first device in selecting the resource is referred to as a second device.

Figure 2:
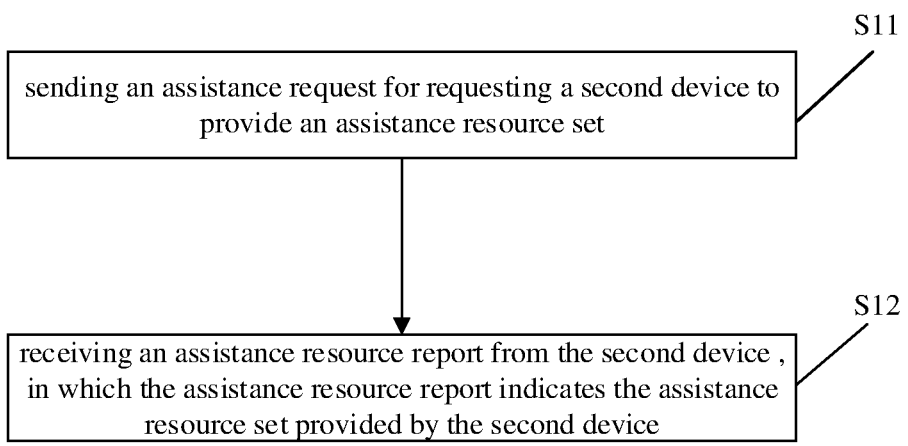
FIG. 2 is a flowchart illustrating a method for selecting a resource according to some embodiments.

FIG. 2 is a flowchart illustrating a method for selecting a resource according to some embodiments. As illustrated in FIG. 2, the method for selecting the resource includes the following steps.

At step S11, an assistance request for requesting a second device to provide an assistance resource set is sent.

At step S12, an assistance resource report is received from the second device. The assistance resource report indicates the assistance resource set provided by the second device.

In embodiments of the disclosure, the first device sends the assistance request to the second device, to request the second device to provide the assistance resource set, which may be understood as that the first device triggers the second terminal to provide assistance in selecting the resource to the first device based on the sent assistance request.

In an implementation, in embodiments of the disclosure, the first device may send the assistance request in response to determining that the resource needs to be selected. That is, it may be understood as that in embodiments of the disclosure, the first device may send the assistance request to select the resource in response to the first device being triggered to select the resource.

In embodiments of the disclosure, the case where the first device is triggered to select the resource may be understood as a case where a data packet of the first device arrives and the first device is triggered to select the resource, that is, in an example of the disclosure, in response to the data packet of the first device arriving and triggering the first device to select the resource, the first device sends the assistance request.

In embodiments of the disclosure, the assistance request is configured to request the second device to provide the assistance resource set. The assistance resource set may be a time-frequency resource set. The time-frequency resource set may include time resources, frequency resources, and/or time-frequency resources.

The second device may send the assistance resource report in response to receiving the assistance request of the first device. The assistance resource report includes the assistance resource set provided by the second device for the first device.

In an implementation, the first device may send the assistance request based on a physical layer control signaling.

In an implementation, the first device selects a resource for sending the assistance request within a resource selection window corresponding to the assistance request by means of a mode 2.

In an implementation, the first device may receive the assistance resource report from the second device based on a physical layer control signaling.

In the above embodiments of the disclosure, the first device sends the assistance request for requesting the second device to provide the assistance resource set. Therefore, the second terminal is triggered to assist the first device in selecting the resource. It may be understood that in the method for selecting the resource provided in embodiments of the disclosure, when the first device receives the assistance resource report sent by the second device, the assistance resource report indicates the assistance resource set for the first device to select the resource. When the first device selects the resource, resources in the assistance resource set are integrated to select the resource.

In an implementation, when the first device in the disclosure selects the resource, a transmission resource is selected at least based on the assistance resource set.

In the disclosure, the first device selects the resource on the basis of the assistance resource set provided by the second device, thereby reducing a probability of conflict occurring during resource selection, improving a resource utilization rate, and improving a transmission reliability.

Figure 3:
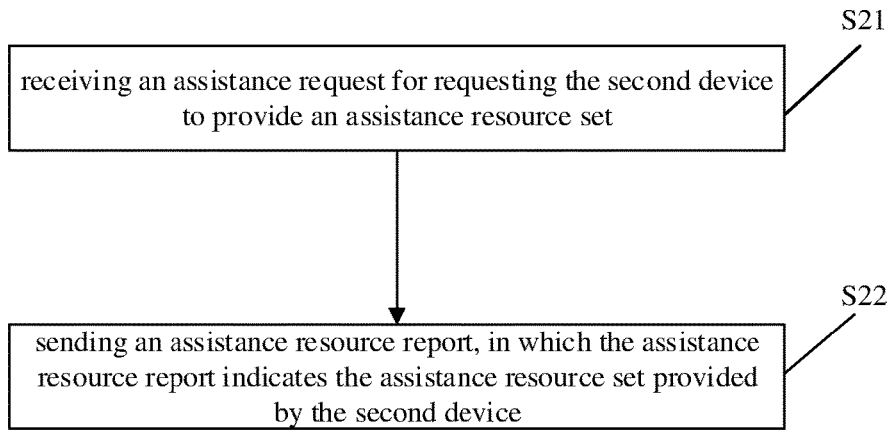
FIG. 3 is a flowchart illustrating a method for selecting a resource according to some embodiments.

FIG. 3 is a flowchart illustrating a method for selecting a resource according to some embodiments. As illustrated in FIG. 3, the method for selecting the resource is applicable to a second device and includes the following steps.

At step S21, an assistance request for requesting the second device to provide an assistance resource set is received.

At step S22, an assistance resource report is sent. The assistance resource report indicates the assistance resource set provided by the second device.

In an example of embodiments of the disclosure, the second device may receive the assistance request based on a physical layer control signaling. In another example, the second device may send the assistance resource report based on a physical layer control signaling. In an implementation, the second device selects a resource for sending the assistance resource report within a resource selection window corresponding to the assistance resource report by means of a mode 2.

In embodiments of the disclosure, the assistance request is configured to request the second device to provide the assistance resource set. The assistance resource set may be a time-frequency resource set. The time-frequency resource set may include time resources, frequency resources, and/or time-frequency resources.

In embodiments of the disclosure, the second device is triggered to assist the first device in selecting the resource when receiving the assistance request sent by the first device.

The second device sends the assistance resource report. The assistance resource report indicates the assistance resource set provided by the second device. The first device receives the assistance resource report sent by the second device, and the assistance resource report indicates the assistance resource set provided by the second device, so that the first device selects the resource based on the assistance resource set provided by the second device, which reduces a probability of conflict occurring when selecting the resource, enhances a resource utilization rate and improves a transmission reliability.

Figure 4:
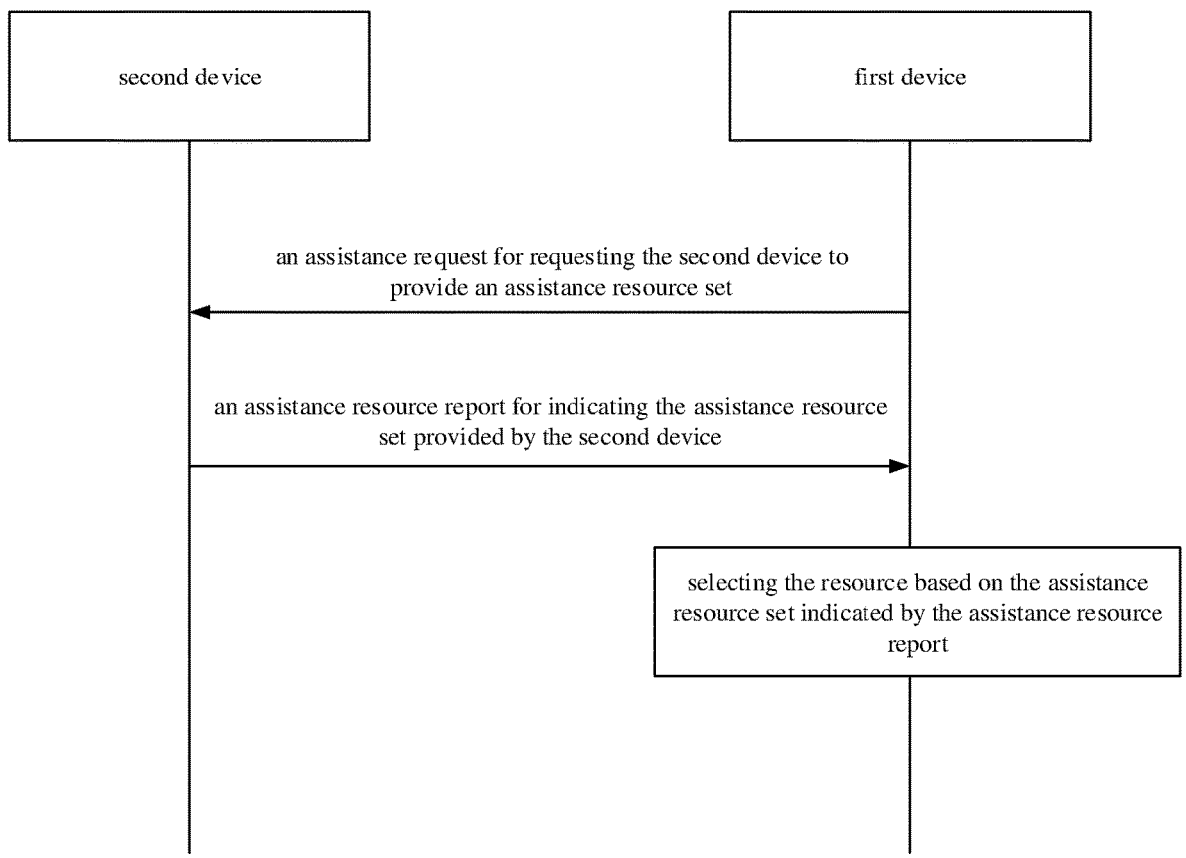
FIG. 4 is a flowchart illustrating a method for selecting a resource according to some embodiments.

It may be understood that the method for selecting the resource provided in embodiments of the disclosure is applicable to an interaction scenario between the first device and the second device. FIG. 4 is a flowchart illustrating a method for selecting a resource according to some embodiments. As illustrated in FIG. 4, the method for selecting the resource is applicable to an interaction communication scenario between the first device and the second device and includes the following steps. As illustrated in FIG. 4, the first device sends an assistance request and the second device receives the assistance request. The second device sends an assistance resource report when receiving the assistance request from the first device. The first device receives the assistance resource report from the second device and selects the resource based on the assistance resource report.

The method for selecting the resource involved in embodiments of the disclosure are illustrated in combination with actual applications in embodiments of the disclosure. It is illustrated by taking the first device being a user equipment B, the assistance request being a message A (MsgA), the second device being a user equipment A, and the assistance resource report being a message B for an example.

Figure 5:
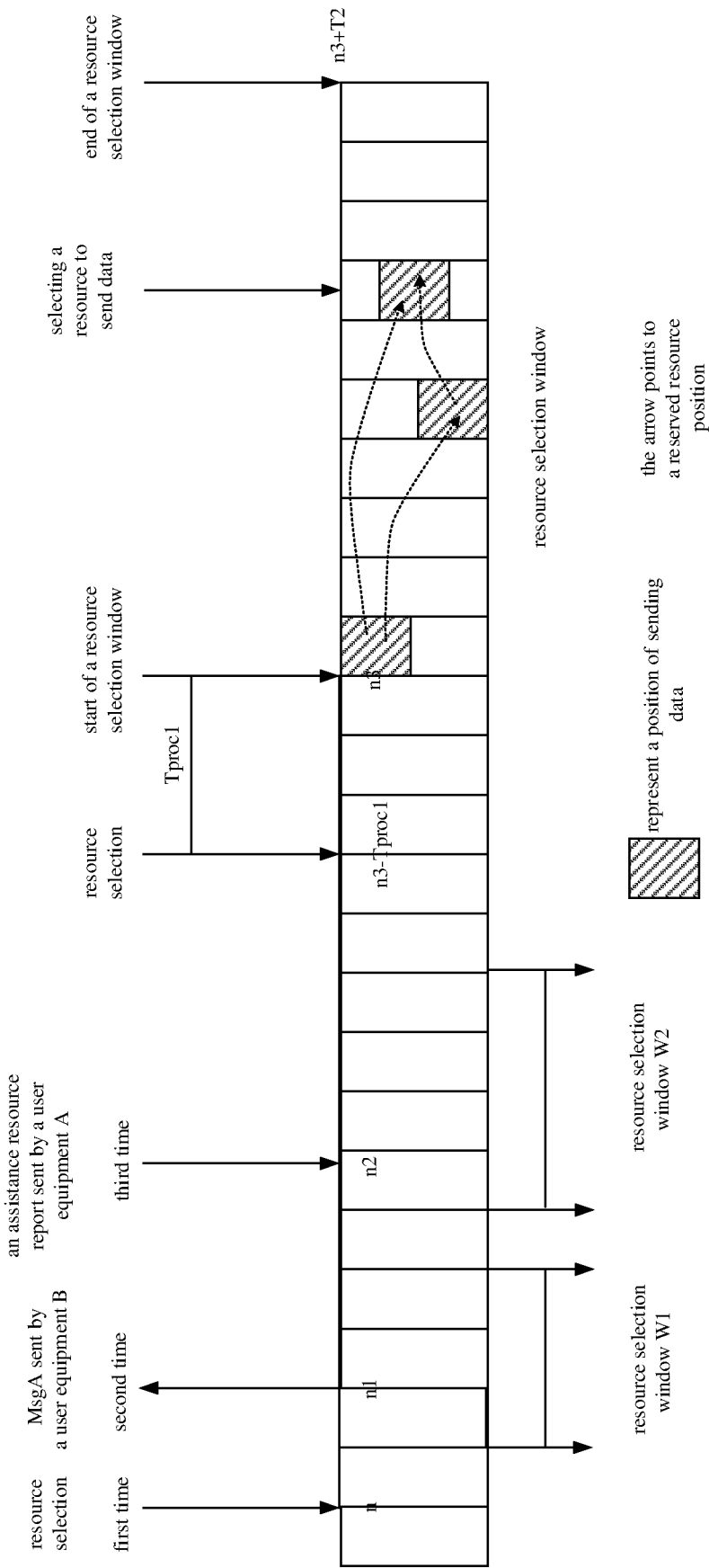
FIG. 5 is a diagram illustrating a timing sequence of selecting a resource according to some embodiments.

FIG. 5 is a diagram illustrating a timing sequence of selecting a resource according to some embodiments. As illustrated in FIG. 5, two new signalings MsgA and MsgB are introduced in a timing sequence execution process when the user equipment A assists the user equipment B in selecting the resource. The MsgA is an assistance request sent by the user equipment B and the MsgB is an assistance resource report sent by the user equipment A. For ease of description, the resource selection process in embodiments of the disclosure is described with reference to a timing sequence diagram in FIG. 5:

(1) When a data packet of the user equipment B arrives, the user equipment B may send the MsgA in response to being triggered at a slot n to select the resource. The MsgA is transmitted by means of the physical layer control signaling.

In embodiments of the disclosure, the user equipment B sends the MsgA to the user equipment A and triggers the user equipment A to assist the user equipment B in selecting the resource. In the disclosure, since the user equipment B is a user equipment that needs to transmit data and selects the resource for data transmission, the user equipment B may determine a time when the data packet arrives, and when the user equipment B determines that the data packet arrives, the user equipment B may select the resource and actively trigger the user equipment A to assist in selecting the resource.

(2) The user equipment A receives the MsgA from the user equipment B at a slot n1, in which the MsgA may be understood as a message that the user equipment B requests the user equipment A to provide the assistance resource set. When the user equipment A receives the MsgA at the slot n1, it may be determined that the user equipment B needs to be assisted and the assistance resource report MsgB is sent to the user equipment B at a slot n2. The MsgB is transmitted by means of the physical layer control signaling. The MsgB carries the assistance resource set recommended by the user equipment A to the user equipment B. The assistance resource set is a candidate resource set that may be used for data transmission and determined by the user equipment A in a resource allocation mode 2 in Release 16.

In an example of the disclosure, the assistance resource set recommended by the user equipment A to the user equipment B is a candidate resource set within a resource selection window of the user equipment B. When the assistance resource set recommended by the user equipment A to the user equipment B is not the candidate resource set within the resource selection window of the user equipment B, the candidate resource set recommended by the user equipment A to the user equipment B has no assistant effect on resource selection of the user equipment B.

It may be understood that, the assistance resource set in embodiments of the disclosure is located within the resource selection window of the first device. The first device may determine that a candidate resource subset (the assistance resource set) is located within the resource selection window of the first device by determining a start time of the resource selection window.

It may be understood that the resource selection window where the assistance resource set is located in embodiments of the disclosure may be understood as the resource selection window for transmitting data by the first device.

Therefore, in embodiments of the disclosure, the user equipment A needs to determine a start position of the resource selection window of the user equipment B, that is, a value of a slot n3 in FIG. 5.

(3) When the user equipment B receives the MsgB, the user equipment B may select the resource based on the candidate resource set perceived by its own resource and the assistance resource set indicated in the assistance resource report from the user equipment A, that is, the candidate resource set for sending data is determines. When the user equipment B does not receive the MsgB, it is considered that there is no assistance report information, and the user equipment B may select the resource based on the candidate resource set perceived by its own resource.

(4) When the user equipment B selects the resource in combination with the assistance resource set indicated by the MsgB, the user equipment B performs a final resource selection when n3-Tproc1. The time of Tproc1 is a minimum time when the user equipment B prepares the data packet after selecting the resource. The Tproc1 takes {3, 5, 9, 17} slots correspondingly for subcarrier intervals of {15, 30, 60, 120} kHz. The user equipment B starts to randomly selects the resource to send data at a resource selection window [n3, n3+T2] when completing preparing the data packet. n3 is a start position of the resource selection window, and n3+T2 is an end position of the resource selection window. T2 is a fixed value. A value of T2 is specified in a 3GPP protocol and depends on an implementation capability of a user equipment, where Tmin≤T2≤packet delay budget (PDB). For different subcarrier intervals 15, 30, 60, 120 kHz, Tmin takes {1, 5, 10, 20} x 2 μ slot values. μ=0, 1, 2, 3, in which, the PDB is the packet delay budget. The data packet is sent at least at the PDB time, otherwise, a sidelink delay requirement is not satisfied.

In embodiments of the disclosure, the resource for transmitting the assistance request and/or the assistance resource report is determined based on a resource allocation mode of an NR V2X mode 2 specified in Release 16. The resource allocation mode of the NR V2X mode 2 specified in Release 16, means that a user equipment determines a candidate resource set and executes a process of sending the assistance request and receiving the assistance resource report by demodulating SCI and demodulation reference signal (DMRS) measurement of a physical sidelink shared channel (PSSCH) or a physical sidelink control channel (PSCCH), of other user equipment.

In embodiments of the disclosure, the first device sends the assistance request to the second device to request the second device to provide the assistance resource set, which may be understood that the first device triggers the second terminal to assist in selecting the resource to the first device based on the sent assistance request, that is, the implementation condition of assisting in selecting the resource for the sidelink device is optimized and the mode 2 resource allocation is enhanced, which reduces the probability of conflicts and effectively enhances the reliability of data transmission.

In an example, in embodiments of the disclosure, the first device identifies the candidate resource set within the resource selection window and randomly selects the resource to send data. In combination with FIG. 5, the resource selection window W1 is used by the user equipment B to select the resource to send the MsgA. The user equipment B may select the resource to send the MsgA at an n1$^{th}$ moment in the resource selection window W1 corresponding to a slot n1. The resource selection window W2 is used by the user equipment A to select the resource to send the MsgB. The user equipment A may select the resource to send the MsgB at an n2th moment of the resource selection window W2. The resource selection window W1 where the MsgA is located depends on a time when the user equipment B selects the resource. The resource selection window W2 where the MsgB is located depends on a time when the user equipment A selects the resource. The resource selection window W1 shall be a time window between [n, n2], and the resource selection window W2 shall be a time window between [n1, n3−Tproc1].

In another example, in combination with FIG. 5, the assistance resource set indicated in the assistance resource report sent by the user equipment A is a resource set within the resource selection window [n3, n3+T2] of the user equipment B. The user equipment A needs to determine the start position of the resource selection window, that is, the slot value of n3, and the user equipment A may determine the resource selection window [n3, n3+T2].

In embodiments of the disclosure, it is illustrated by achieving an implementation solution that the assistance resource set is located within the resource selection window of the first device.

In embodiments of the disclosure, when a start time of the resource selection window and/or an end time of the resource selection window are determined, the resource selection window may be determined. In an implementation, the second device may determine the start time of the resource selection window, and determine the resource selection window based on the start time of the resource selection window. In an example, a specified time interval after the start time of the resource selection window is taken as the resource selection window. For example, in embodiments of the disclosure, the specified time interval is represented by $\Delta T$. In an implementation, $\Delta T$ is a processing time, and the value is a fixed value and preconfigured by a network device.

In an implementation, in embodiments of the disclosure, the start time of the resource selection window is determined based on the time when the first device is triggered to select the resource. For ease of description, the time when the first device is triggered to select the resource is referred to as a first time. For example, in combination with FIG. 5, the first time may be n. The start position of the resource selection window is $n3=n+\Delta T$.

In embodiments of the disclosure, the first device may determine the first time. However, the second device does not know the first time. Therefore, in embodiments of the disclosure, the first time needs to be dynamically indicated to the second device, and for example, the first time is indicated by indication information. In embodiments of the disclosure, the indication information for indicating the first time is referred to as first indication information. The first device sends the first indication information for indicating the first time. The second device receives the first indication information for indicating the first time, and further the second device may determine the first time based on the first indication information. The start position of the resource selection window is determined based on the first time and $\Delta T$.

In embodiments of the disclosure, the first indication information is carried in a physical layer control signaling for sending the assistance request.

It is still illustrated by taking the first device being the user equipment B, the assistance request being the message A (MsgA), the second device being the user equipment A, and the assistance resource report being the message B for an example.

Figure 6:
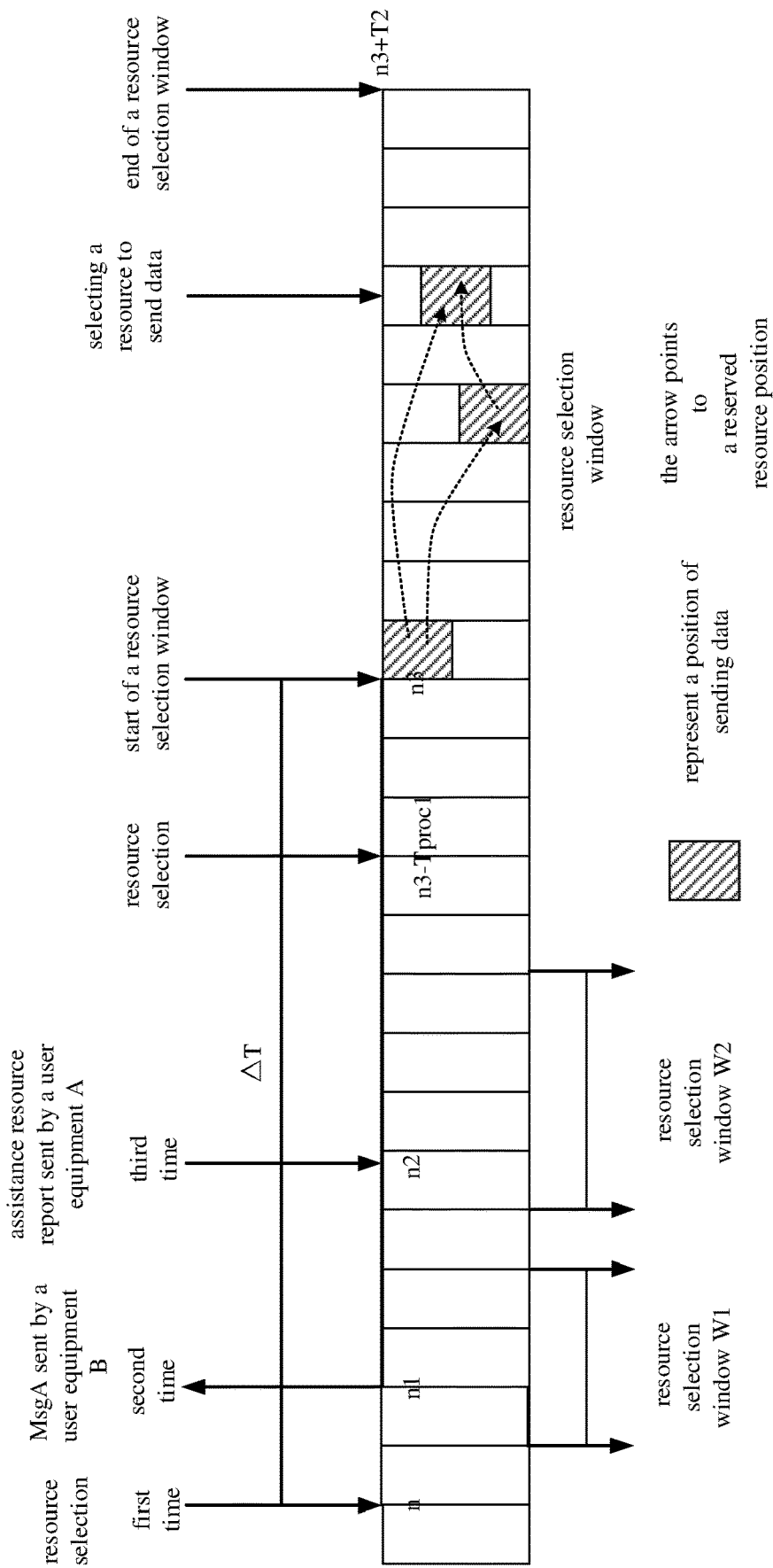
FIG. 6 is a diagram illustrating a timing sequence of determining a start position of a resource selection window in a resource selection process according to some embodiments.

FIG. 6 is a diagram illustrating a timing sequence of determining a start position of a resource selection window in a resource selection process according to some embodiments. A value of n is dynamically indicated and $n3=n+\Delta T$. As illustrated in FIG. 6, the time when the user equipment B selects the resource is uncertain. Therefore, the value of n is dynamic and may not be predicted by the user equipment A. The user equipment B needs to indicate the value of n in the physical layer control signaling of the MsgA, and the user equipment A obtains the value of n by decoding the MsgA, and calculates a value of n3 by $n3=n+\Delta T$, thereby obtaining the start time of the resource selection window of the user equipment B. The value of n is indicated by the physical layer control signaling, with a good real-time performance, but resulting in a certain control signaling overhead.

In an implementation, in embodiments of the disclosure, the start time of the resource selection window is determined based on a time when the second device receives the assistance request. For ease of description, the time when the second device receives the assistance request is referred to as a second time. For example, in combination with FIG. 5, the second time may be n1. The start position of the resource selection window is $n3=n1+\Delta T$.

The time difference between the time when the second device receives the assistance request and the time when the first device sends the assistance request is at a microsecond level, and the time difference does not exceed a duration of a cyclic prefix, which may not cause an inter-symbol interference. Therefore, the time difference may be ignored, and in embodiments of the disclosure, the second time for determining the start time of the resource selection window is the time when the first device sends the assistance request.

It is still illustrated by taking the first device being the user equipment B, the assistance request being the message A (MsgA), the second device being the user equipment A, and the assistance resource report being the message B for an example.

Figure 7:
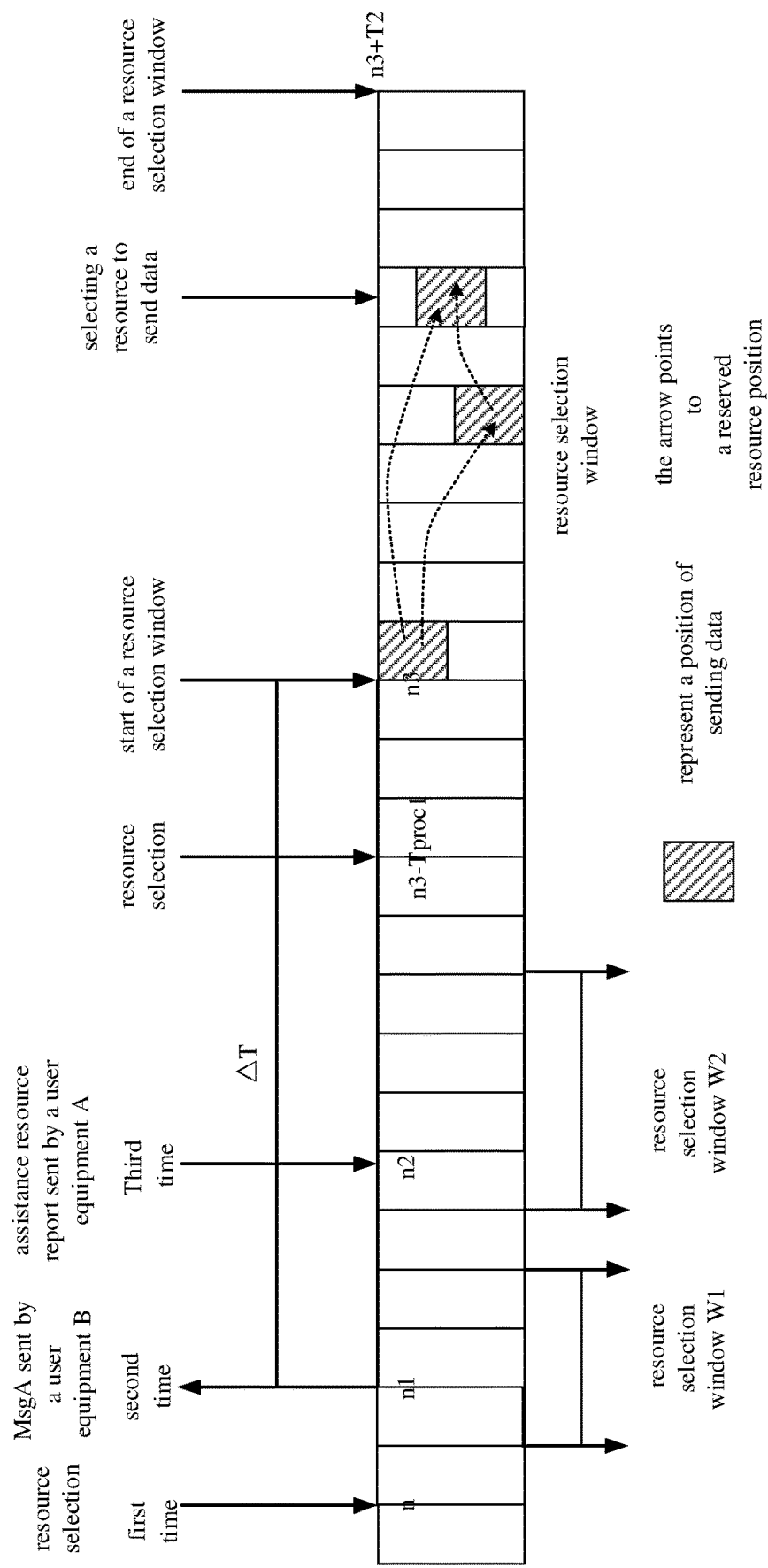
FIG. 7 is a diagram illustrating a timing sequence of determining a start position of a resource selection window in a resource selection process according to some embodiments.

FIG. 7 is a diagram illustrating a timing sequence of determining a start position of a resource selection window in a resource selection process according to some embodiments. As illustrated in FIG. 7, a value of n1 is the time when the user equipment B sends the assistance request. Since the time difference between the time when the user equipment B sends the MsgA and the time when the user equipment A receives the MsgA is at a microsecond level, and the time difference does not exceed a duration of a cyclic prefix, which may not cause an inter-symbol interference. Therefore, the time difference may be ignored and the time n1 when the user equipment B sends the MsgA is taken as the time when the user equipment A receives the MsgA. When the user equipment A determines the value of n1, the user equipment A may directly calculate n3 by $n3=n1+\Delta T$, thereby obtaining the start time of the resource selection window of the user equipment B. With respect to the solution, the value of the slot n is not required to be indicated in the physical layer control signaling of the MsgA, and the value of n3 is directly calculated based on the known value of the user equipment A, thereby ensuring the reliability. However, in order to meet the delay requirement of V2X, it is necessary to set a suitable $\Delta T$ value for the user equipment A, to ensure that the time from n1 to n3 is short enough as much as possible.

In an implementation, in embodiments of the disclosure, the start time of the resource selection window is determined based on the time when the second device sends the assistance resource report. For ease of description, the time when the second device sends the assistance resource report is referred to as a third time. For example, in combination with FIG. 5, the third time may be n2. The start position of the resource selection window is $n3=n2+\Delta T$.

The time difference between the time when the second device sends the assistance resource report and the time when the first device receives the assistance resource report is at a microsecond level, and the time difference does not exceed a duration of a cyclic prefix, which may not cause an inter-symbol interference. Therefore, the time difference may be ignored and in embodiments of the disclosure, the third time for determining the start time of the resource selection window is also the time when the first device receives the assistance resource report.

In embodiments of the disclosure, a latest time of sending the assistance resource report needs to be configured for the third time. The third time is less than or equal to a preset latest time of sending the assistance resource report. When the time of sending the assistance resource report exceeds the latest time of the assistance resource report, a data packet has not been sent but has expired in response to taking a specified time interval after the start time of the resource as the resource selection window and the start time of the resource selection window calculated exceeding the PDB. In this case, the first device no longer uses the assistance resource report of the second device, and selects the resource by only using the candidate resource set determined by the first device.

It is still illustrated by taking the first device being the user equipment B, the assistance request being the message A (MsgA), the second device being the user equipment A, and the assistance resource report being the message B for an example.

Figure 8:
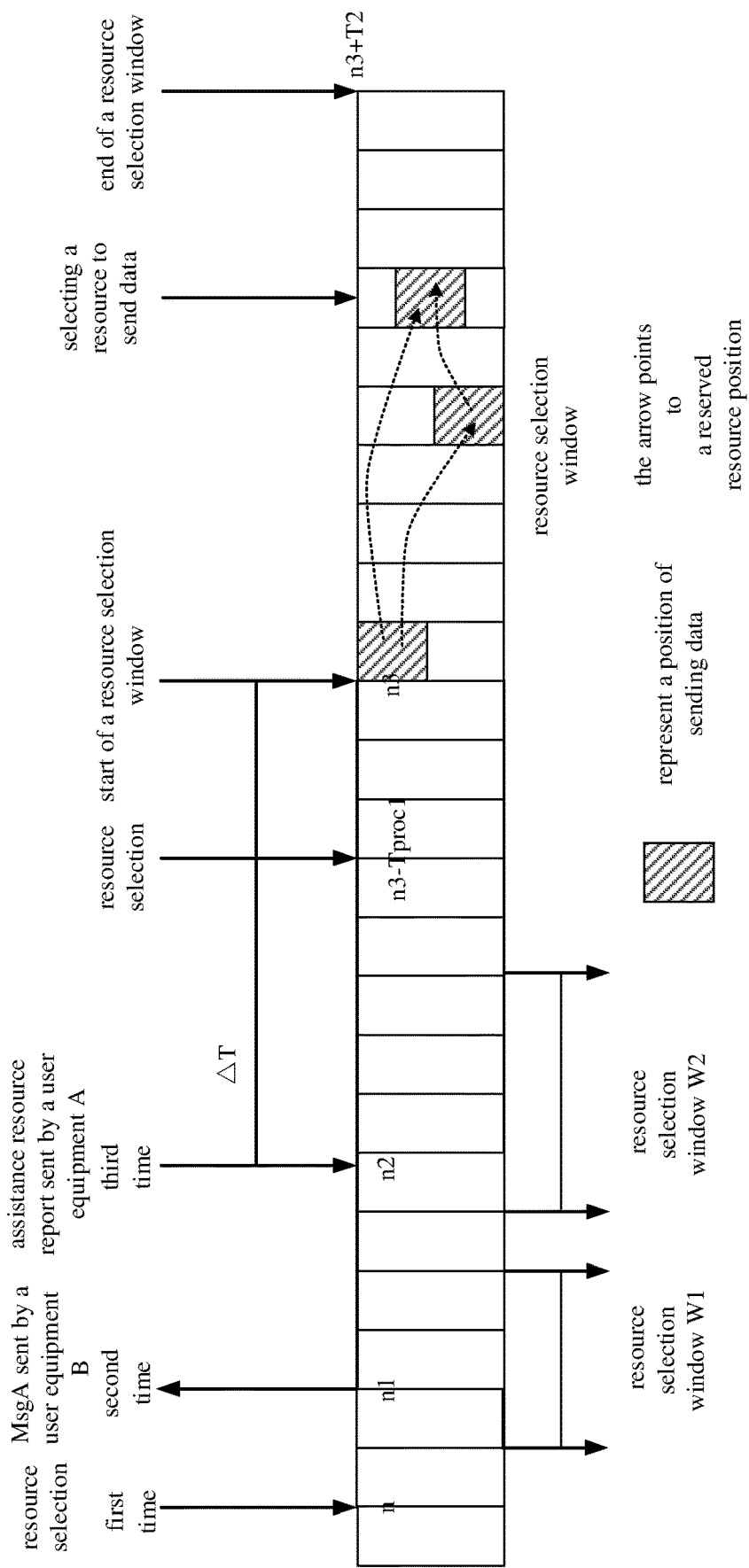
FIG. 8 is a diagram illustrating a timing sequence of determining a start position of a resource selection window in a resource selection process according to some embodiments.

FIG. 8 is a diagram illustrating a timing sequence of determining a start position of a resource selection window in a resource selection process according to some embodiments. As illustrated in FIG. 8, a value of n3 is a fixed value by n3=n2+ΔT. As illustrated in FIG. 8, since n2 is the time when the user equipment A sends the MsgB, the user equipment A knows a value of n2. The user equipment A may directly calculate n3 by n3=n1+ΔT, thereby obtaining the start time of the resource selection window of the user equipment B. At the same time, although n2 is not required to be dynamically indicated, a latest time N2 needs to be configured for n2. n2≤N2, and the user equipment A is required to send the assistance resource report MsgB before N2. If the time n2 for sending the MsgB exceeds the latest time N2, the value of the start time n3 of the resource selection window calculated by n3=n2+ΔT exceeds the PDB. In this case, the data packet has not been sent, but has timed out. In this case, the user equipment B no longer uses the assistance resource report of the user equipment A, and selects the resource by only using the candidate resource set determined by the user equipment B. With respect to the solution, the value of the slot n is not required to be indicated by the physical layer control signaling of the MsgA, and the value of n3 is directly calculated based on the known value of the user equipment A, thereby ensuring the reliability and the accuracy. However, in order to satisfy the delay requirement of V2X, it is necessary to set a suitable ΔT value for the user equipment A, to ensure that the time n2 to n3 is short enough as much as possible.

In the disclosure, by an implementation solution that the start time of the resource selection window is determined based on the first time, the second time, or the third time, the start time position of the resource selection window is optimized, and steps and/or timing sequences of the assistance resource selection implementation for the sidelink device are optimized. For example, in embodiments of the disclosure, implementation steps and/or timing sequences are configured for the whole process that the user equipment A assists the user equipment B in selecting the resource, and the solution that the user equipment A obtains the value of the start position n3 of the resource selection window of the user equipment B is provided. In the disclosure, the mode 2 resource allocation is enhanced, which reduces the probability of conflicts and effectively improves the reliability of data transmission.

Based on the same conception, an apparatus for selecting a resource is further provided in embodiments of the disclosure.

It may be understood that, the apparatus for selecting the resource provided in embodiments of the disclosure includes hardware structures and/or software modules that perform corresponding functions in order to achieve the above functions. In combination with modules and algorithm steps of examples described in embodiments of the disclosure, embodiments of the disclosure may be implemented in a form of hardware or a combination of hardware and computer software. Whether a certain function is executed by hardware or computer software driving hardware depends on specific applications and design constraints of the technical solution. Those skilled in the art may adopt different manners for each specific application to implement the described functions, but such implementation should not be considered as beyond the scope of the technical solutions in embodiments of the disclosure.

Figure 9:
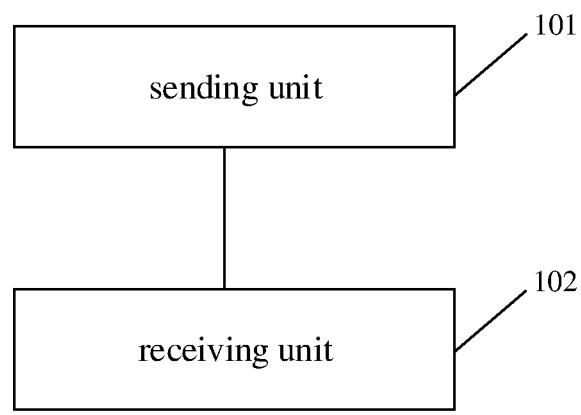
FIG. 9 is a block diagram illustrating an apparatus for selecting a resource according to some embodiments.

FIG. 9 is a block diagram illustrating an apparatus for selecting a resource according to some embodiments. As illustrated in FIG. 9, the apparatus 100 for selecting the resource is applicable to a first device. The apparatus 100 for selecting the resource includes a sending unit 101 and a receiving unit 102.

The sending unit 101 is configured to send an assistance request for requesting a second device to provide an assistance resource set. The receiving unit 102 is configured to receive an assistance resource report from the second device. The assistance resource report indicates the assistance resource set provided by the second device.

In an implementation, the assistance resource set is located within a resource selection window of the first device.

In an implementation, a start time of the resource selection window is determined based on a first time, and the first time is a time when the first device is triggered to select the resource.

In an implementation, the sending unit is 101 is further configured to: send first indication information for indicating the first time.

In an implementation, the first indication information is carried in a physical layer control signaling for sending the assistance request.

In an implementation, a start time of the resource selection window is determined based on a second time, and the second time is a time when the second device receives the assistance request.

In an implementation, the time when the second device receives the assistance request is a time when the first device sends the assistance request.

In an implementation, a start time of the resource selection window is determined based on a third time, and the third time is a time when the second device sends the assistance resource report.

In an implementation, the time when the second device sends the assistance resource report is a time when the first device receives the assistance resource report.

In an implementation, the third time is less than or equal to a preset latest time of sending the assistance resource report.

In an implementation, the sending unit 101 sends the assistance request by: sending the assistance request in response to a data packet of the first device arriving and triggering the first device to select the resource.

In an implementation, the sending unit 101 sends the assistance request by: sending the assistance request based on a physical layer control signaling.

In an implementation, the receiving unit 102 receives the assistance resource report from the second device by: receiving the assistance resource report from the second device based on the physical layer control signaling.

Figure 10:
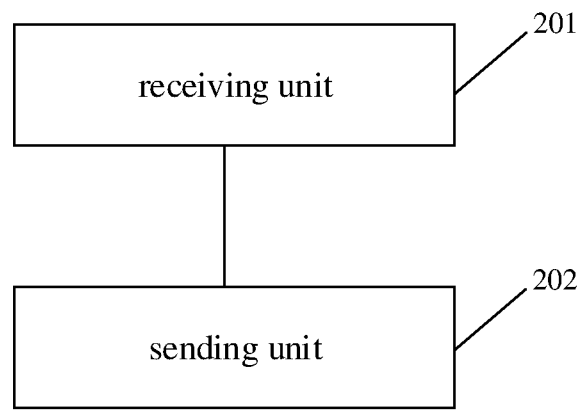
FIG. 10 is a block diagram illustrating an apparatus for selecting a resource according to some embodiments.

FIG. 10 is a block diagram illustrating an apparatus for selecting a resource according to some embodiments. As illustrated in FIG. 10, the apparatus 200 for selecting the resource is applicable to a second device. The apparatus 200 for selecting the resource includes a receiving unit 201 and a sending unit 202.

The receiving unit 201 is configured to receive an assistance request for requesting second device to provide an assistance resource set. The sending unit 202 is configured to send an assistance resource report. The assistance resource report indicates the assistance resource set provided by second device.

In an implementation, the assistance resource set is located within a resource selection window of a first device.

In an implementation, the sending unit 202 is further configured to: determine a start time of the resource selection window, and determine the resource selection window based on the start time.

In an implementation, the sending unit 202 determines the resource selection window based on the start time by: taking a specified time interval after the start time as the resource selection window.

In an implementation, the start time of the resource selection window is determined based on a first time, and the first time is a time when the first device is triggered to select the resource.

In an implementation, the receiving unit 201 is further configured to: receive first indication information for indicating the first time.

In an implementation, the first indication information is carried in a physical layer control signaling for the assistance request.

In an implementation, the start time of the resource selection window is determined based on a second time, and the second time is a time when the second device receives the assistance request.

In an implementation, the time when the second device receives the assistance request is a time when the first device sends the assistance request.

In an implementation, the start time of the resource selection window is determined based on a third time, and the third time is a time when the second device sends the assistance resource report.

In an implementation, the time when the second device sends the assistance resource report is a time when the first device receives the assistance resource report.

In an implementation, the third time is less than or equal to a preset latest time of sending the assistance resource report.

In an implementation, the receiving unit 201 receives the assistance request by receiving the assistance request based on a physical layer control signaling.

In an implementation, the sending unit 202 sends the assistance resource report by: sending the assistance resource report based on a physical layer control signaling.

With respect to the apparatuses in the above embodiments, the specific manners for performing operations for individual modules therein have been described in detail in the embodiments regarding the methods, which will not be elaborated herein.

Figure 11:
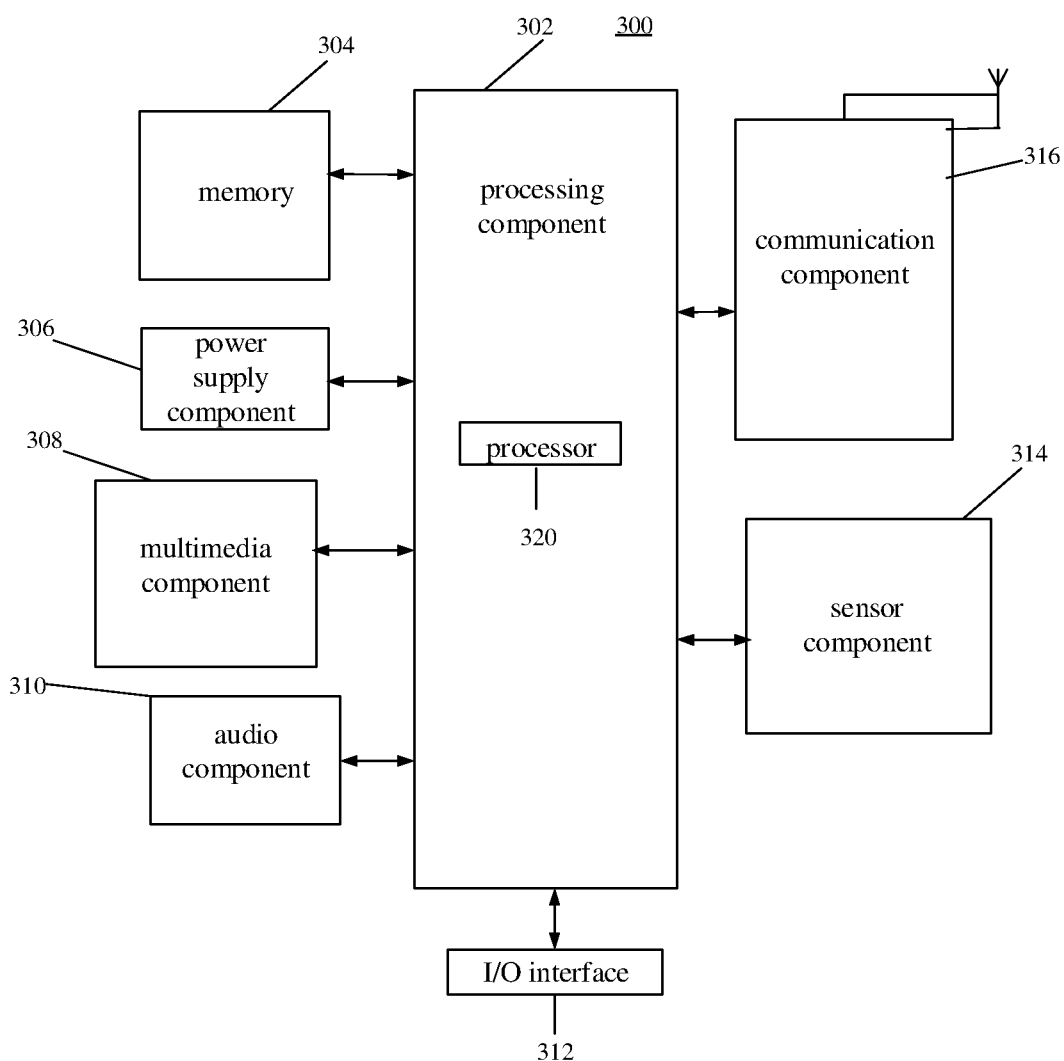
FIG. 11 is a block diagram illustrating a device for selecting a resource according to some embodiments.

FIG. 11 is a block diagram illustrating a device 300 for selecting a resource according to some embodiments. For example, the device 300 may be a first device or a second device. The first device or the second device may be a mobile phone, a computer, a digital broadcasting terminal, a messaging device, a game console, a tablet device, a medical device, a fitness equipment, a personal digital assistant, etc.

As illustrated in FIG. 11, the device 300 may include one or more components: a processing component 302, a memory 304, a power supply component 306, a multimedia component 308, an audio component 310, an input/output (I/O) interface 312, a sensor component 314, and a communication component 316.

The processing component 302 typically controls overall operations of the device 200, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 306 may provide power to various components of the device 300. The power supply component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

It may be further understood that, "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

It should be further understood that, although the terms "first", "second", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the invention following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structures described above and shown in the drawings, and various modifications and changes may be made without departing from its scope. The scope of the disclosure is only limited by the appended claims. The scope of the disclosure is only limited by the appended claims.

The invention claimed is:

1. A method for selecting a resource, performed by a first device, comprising:
    sending an assistance request for requesting a second device to provide an assistance resource set; and
    receiving an assistance resource report from the second device, wherein the assistance resource report indicates the assistance resource set provided by the second device;
    wherein the assistance resource set is in a resource selection window of the first device;
    wherein a start time of the resource selection window is determined based on a first time, and the first time is a time when the first device is triggered to select the resource.

2. The method of claim 1, further comprising:
    selecting a transmission resource at least based on the assistance resource set.

3. The method of claim 1, further comprising:
    sending first indication information for indicating the first time, wherein the first indication information is carried in a physical layer control signaling for sending the assistance request.

4. The method of claim 1, wherein sending the assistance request comprises:
    sending the assistance request in response to a data packet of the first device arriving and triggering the first device to select the resource.

5. The method of claim 1, wherein sending the assistance request comprises:
    sending the assistance request based on a physical layer control signaling.

6. The method of claim 1, wherein receiving the assistance resource report from the second device comprises:
    receiving the assistance resource report from the second device based on a physical layer control signaling.

7. A non-transitory computer-readable storage medium, wherein when instructions in the storage medium are executed by a processor of a first device, the first device is caused to perform the method of claim 1.

8. A method for selecting a resource, performed by a second device, comprising:
    receiving an assistance request for requesting the second device to provide an assistance resource set; and sending an assistance resource report, wherein the assistance resource report indicates the assistance resource set provided by the second device;

wherein the assistance resource set is in a resource selection window of a first device; and the method further comprises:

determining a start time of the resource selection window, and determining the resource selection window based on the start time, wherein the first time is a time when the first device is triggered to select the resource.

9. The method of claim 8, wherein determining the resource selection window based on the start time comprises:

taking a specified time interval after the start time as the resource selection window.

10. The method of claim 8, further comprising:

receiving first indication information for indicating the first time, wherein the first indication information is carried in a physical layer control signaling of the assistance request.

11. The method of claim 8, wherein receiving the assistance request comprises:

receiving the assistance request based on a physical layer control signaling.

12. The method of claim 8, wherein sending the assistance resource report comprises:

sending the assistance resource report based on a physical layer control signaling.

13. A second device for selecting a resource, comprising:

a processor; and a memory configured to store instructions executable by the processor;

wherein the processor is configured to perform the method of claim 8.

14. A first device for selecting a resource, comprising:

a processor; and a memory configured to store instructions executable by the processor;

wherein the processor is configured to:

send an assistance request for requesting a second device to provide an assistance resource set; and receive an assistance resource report from the second device, wherein the assistance resource report indicates the assistance resource set provided by the second device;

wherein the assistance resource set is in a resource selection window of the first device;

wherein a start time of the resource selection window is determined based on a first time, and the first time is a time when the first device is triggered to select the resource.

* * * * *